United States Patent
Qiu et al.

(10) Patent No.: US 12,087,281 B2
(45) Date of Patent: Sep. 10, 2024

(54) SYSTEMS AND METHODS FOR UNSUPERVISED STRUCTURE EXTRACTION IN TASK-ORIENTED DIALOGUES

(71) Applicant: Salesforce, Inc., San Francisco, CA (US)

(72) Inventors: Liang Qiu, San Jose, CA (US); Chien-Sheng Wu, Mountain View, CA (US); Wenhao Liu, Redwood City, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 301 days.

(21) Appl. No.: 17/589,693

(22) Filed: Jan. 31, 2022

(65) Prior Publication Data
US 2023/0120940 A1  Apr. 20, 2023

Related U.S. Application Data

(60) Provisional application No. 63/256,190, filed on Oct. 15, 2021.

(51) Int. Cl.
*G10L 15/183* (2013.01)
*G10L 15/05* (2013.01)
(Continued)

(52) U.S. Cl.
CPC .......... *G10L 15/063* (2013.01); *G10L 15/05* (2013.01); *G10L 15/183* (2013.01); *G06N 20/00* (2019.01); *G10L 2015/0631* (2013.01)

(58) Field of Classification Search
CPC .................. G10L 15/063; G10L 15/16; G10L 2015/0631; G10L 15/183; G10L 15/02;
(Continued)

(56) References Cited

U.S. PATENT DOCUMENTS 10,140,977 B1 * 11/2018 Raux ...................... G10L 15/063
10,970,493 B1 *  4/2021 Lee ......................... G06N 20/00
(Continued)

OTHER PUBLICATIONS

Julian Serban et al., A hierarchical latent variable encoder-decoder model for generating dialogues. In Proceedings of the AAAI Conference on Artificial Intelligence, vol. 31. (2017).
(Continued)

*Primary Examiner* — Vijay B Chawan
(74) *Attorney, Agent, or Firm* — Haynes and Boone, LLP

(57) ABSTRACT

Embodiments described herein propose an approach for unsupervised structure extraction in task-oriented dialogues. Specifically, a Slot Boundary Detection (SBD) module is adopted, for which utterances from training domains are tagged with the conventional BIO schema but without the slot names. A transformer-based classifier is trained to detect the boundary of potential slot tokens in the test domain. Next, while the state number is usually unknown, it is more reasonable to assume the slot number is given when analyzing a dialogue system. The detected tokens are clustered into the number of slot of groups. Finally, the dialogue state is represented with a vector recording the modification times of every slot. The slot values are then tracked through each dialogue session in the corpus and label utterances with their dialogue states accordingly. The semantic structure is portrayed by computing the transition frequencies among the unique states.

20 Claims, 16 Drawing Sheets

(51) Int. Cl.
*G10L 15/06* (2013.01)
*G06N 20/00* (2019.01)

(58) Field of Classification Search
CPC ....... G10L 15/06; G10L 15/075; G10L 15/22; G10L 2015/0638; G10L 15/1815; G10L 15/1822; G10L 15/197
See application file for complete search history.

(56) References Cited

U.S. PATENT DOCUMENTS

| | | | | |
|---|---|---|---|---|
| 11,132,499 | B2* | 9/2021 | Liang | G06F 40/169 |
| 11,468,246 | B2* | 10/2022 | Olabiyi | G10L 15/16 |
| 11,657,215 | B2* | 5/2023 | Liang | G06F 16/3329 |
| | | | | 704/257 |
| 11,676,067 | B2* | 6/2023 | Kneller | G06F 40/35 |
| | | | | 706/12 |
| 2019/0066660 | A1* | 2/2019 | Liang | G10L 15/183 |
| 2020/0193265 | A1* | 6/2020 | Hill | G06N 3/045 |
| 2021/0374358 | A1* | 12/2021 | Xia | G06N 3/047 |
| 2021/0374603 | A1* | 12/2021 | Xia | G06N 3/045 |
| 2022/0004702 | A1* | 1/2022 | Liang | G10L 15/183 |
| 2022/0093088 | A1* | 3/2022 | Rangarajan Sridhar | |
| | | | | G06F 16/338 |

OTHER PUBLICATIONS

Tsung-Hsien Wen et al., A network-based end-to-end trainable task-oriented dialogue system. In Proceedings of the 15th Conference of the European Chapter of the Association for Computational Linguistics: vol. 1, Long Papers, pp. 438-449, Valencia, Spain. Association for Computational Linguistics. (2017).

Chien-Sheng Wu e al., TOD-BERT: Pre-trained natural language understanding for task-oriented dialogue. In Proceedings of the 2020 Conference on Empirical Methods in Natural Language Processing (EMNLP), pp. 917-929, Online. Association for Computational Linguistics. (2020).

Tom Bocklisch et al., Rasa: Open source language understanding and dialogue management. arXiv preprint arXiv:1712.05181 (2017).

* cited by examiner

| Dialogue | Dialogue State Slot Value |
|---|---|
| [usr] Can you please help me find a place to go?<br>[sys] I've found 79 places for you to go. Do you have any specific ideas in your mind? | [0, 0, 0]<br>['', '', ''] |
| [usr] I'd like a sports place in the centre please.<br>[sys] There are no results matching your query. Can I try a different area or type? | [1, 0, 0]<br>['centre', '', ''] |
| [usr] Okay, are there any cinemas in the centre?<br>[sys] We have vue cinema. | [1, 1, 0]<br>['centre', 'cinemas', ''] |

*FIG. 1*

| MultiWOZ | |
|---|---|
| Utt | [usr] a train to London King Cross that departs after 08:15 |
| Slots | O O O O B I I O O O B |

← 410

| ATIS | |
|---|---|
| Utt | i want to fly from baltimore to dallas round trip |
| Slots | O O O O O B O B B I |

← 420

| Snips | |
|---|---|
| Utt | book a restaurant for eight people in six years |
| Slots | O O B O B O B I |

| Method | F1$_{slot}$ | | | | | F1$_{tokens}$ | | | | |
|---|---|---|---|---|---|---|---|---|---|---|
| | Taxi | Restaurant | Hotel | Attraction | Train | Taxi | Restaurant | Hotel | Attraction | Train |
| spaCy | 0.44 | 0.48 | 0.49 | 0.34 | 0.41 | 0.44 | 0.48 | 0.49 | 0.34 | 0.41 |
| TOD-BERT$_{ATIS}$ | 0.57 | 0.56 | 0.52 | 0.45 | 0.62 | 0.57 | 0.54 | 0.44 | 0.43 | 0.60 |
| TOD-BERT$_{SNIPS}$ | 0.50 | 0.53 | 0.48 | 0.41 | 0.52 | 0.55 | 0.49 | 0.41 | 0.37 | 0.51 |
| TOD-BERT$_{MWOZ}$ | 0.90 | 0.89 | 0.84 | 0.91 | 0.84 | 0.90 | 0.89 | 0.82 | 0.91 | 0.84 |

*FIG. 8*

|  | ARI | | | | | AMI | | | | | SC | | | | |
| --- | --- | --- | --- | --- | --- | --- | --- | --- | --- | --- | --- | --- | --- | --- | --- |
|  | Taxi | Rest. | Hotel | Attr. | Train | Taxi | Rest. | Hotel | Attr. | Train | Taxi | Rest. | Hotel | Attr. | Train |
| Random | 0.00 | 0.00 | 0.00 | 0.00 | 0.00 | 0.00 | 0.00 | 0.00 | 0.00 | 0.00 | - | - | - | - | - |
| VRNN | 0.05 | 0.00 | 0.00 | 0.00 | 0.00 | 0.05 | 0.02 | 0.00 | 0.01 | 0.06 | - | - | - | - | - |
| BERT-KMeans | 0.02 | 0.01 | 0.01 | 0.01 | 0.01 | 0.10 | 0.09 | 0.02 | 0.03 | 0.06 | 0.11 | 0.08 | 0.06 | 0.13 | 0.09 |
| TOD-BERT-mlm | 0.02 | 0.01 | 0.01 | 0.02 | 0.02 | 0.13 | 0.10 | 0.03 | 0.05 | 0.11 | 0.12 | 0.08 | 0.06 | 0.17 | 0.10 |
| TOD-BERT-jnt | 0.03 | 0.02 | 0.02 | 0.03 | 0.03 | 0.16 | 0.13 | 0.05 | 0.08 | 0.15 | 0.09 | 0.08 | 0.06 | 0.13 | 0.07 |
| BERT-spaCy | 0.01 | 0.06 | 0.04 | 0.01 | 0.01 | 0.11 | 0.19 | 0.13 | 0.06 | 0.08 | - | - | - | - | - |
| TOD-BERT-spaCy | 0.01 | 0.05 | 0.05 | 0.01 | 0.01 | 0.10 | 0.17 | 0.14 | 0.05 | 0.06 | - | - | - | - | - |
| TOD-BERT-SBD$_{MWOZ}$ | 0.13 | 0.00 | 0.00 | -0.01 | 0.07 | 0.15 | 0.13 | 0.04 | 0.07 | 0.18 | 0.40 | 0.31 | 0.26 | 0.41 | 0.39 |
| TOD-BERT-DET$_{ATIS}$ | 0.08 | 0.05 | 0.09 | 0.03 | 0.06 | 0.26 | 0.22 | 0.25 | 0.15 | 0.26 | - | - | - | - | - |
| TOD-BERT-DET$_{SNIPS}$ | 0.06 | 0.05 | 0.11 | 0.03 | 0.04 | 0.25 | 0.23 | 0.22 | 0.09 | 0.22 | - | - | - | - | - |
| TOD-BERT-DET$_{MWOZ}$ | 0.13 | 0.26 | 0.20 | 0.28 | 0.29 | 0.35 | 0.49 | 0.47 | 0.43 | 0.47 | - | - | - | - | - |

*FIG. 9*

| Perplexity↓ | Taxi | Rest. | Hotel | Attr. | Train |
|---|---|---|---|---|---|
| Original train | 4.88 | 4.46 | 6.16 | 7.75 | 6.58 |
| + MFS | 5.34 | 6.54 | 7.17 | 8.39 | 6.91 |
| + MRDA | 4.64 | 3.69 | 5.57 | 3.91 | 5.83 |

| BLEU↑ | Taxi | Rest. | Hotel | Attr. | Train |
|---|---|---|---|---|---|
| Original train | 9.88 | 12.54 | 8.68 | 8.46 | 8.93 |
| + MFS | 9.73 | 12.56 | 7.54 | 9.21 | 7.64 |
| + MRDA | 22.13 | 18.77 | 10.66 | 47.79 | 9.20 |

*FIG. 12*

| State Overlap | Taxi | Rest. | Hotel | Attr. | Train |
|---|---|---|---|---|---|
| Train Only | 9 | 97 | 387 | 0 | 25 |
| Valid Only | 0 | 12 | 51 | 0 | 7 |
| Test Only | 0 | 0 | 0 | 0 | 0 |
| Train & Valid | 18 | 68 | 148 | 10 | 38 |
| Train & Test | 16 | 55 | 99 | 9 | 32 |
| Test & Valid | 16 | 62 | 141 | 9 | 37 |
| Train & Valid & Test | 16 | 55 | 99 | 9 | 32 |

*FIG. 13*

SYSTEMS AND METHODS FOR UNSUPERVISED STRUCTURE EXTRACTION IN TASK-ORIENTED DIALOGUES

CROSS REFERENCES

The present disclosure is a nonprovisional of and claims priority under 35 U.S.C. 119 to U.S. provisional application No. 63/256,190, filed on Oct. 15, 2021, which is hereby expressly incorporated by reference herein in its entirety.

TECHNICAL FIELD

The embodiments relate generally to time series data processing and machine learning systems, and more specifically to systems and methods for unsupervised structure extraction in task-oriented dialogues with slot clustering.

BACKGROUND

Neural networks have been used to generate conversational responses and thus conduct a dialogue with a human user to fulfill a task. For example, a human user can engage in a conversation with an intelligent assistant to book travel tickets, make restaurant reservations, and/or the like. Extracting structure information from a dialogue corpus can help to better understand user and system behaviors. Specifically, in task-oriented dialogues, dialogue structure has often been considered as transition graphs among dialogue states. However, annotating dialogue states manually for training dialogue data can be expensive and time-consuming.

Therefore, there is a need to efficiently obtaining dialogue structures for training a dialogue agent.

BRIEF DESCRIPTION OF THE DRAWINGS

FIG. 1 is a simplified diagram illustrating an example dialogue in the language domain, according to embodiments described herein.

FIG. 4 is a simplified diagram illustrating an example aspect of slot boundary annotation, according to embodiments described herein.

FIGS. 8-13 provide example tables illustrating example performance of different language models discussed herein.

Figure 2:
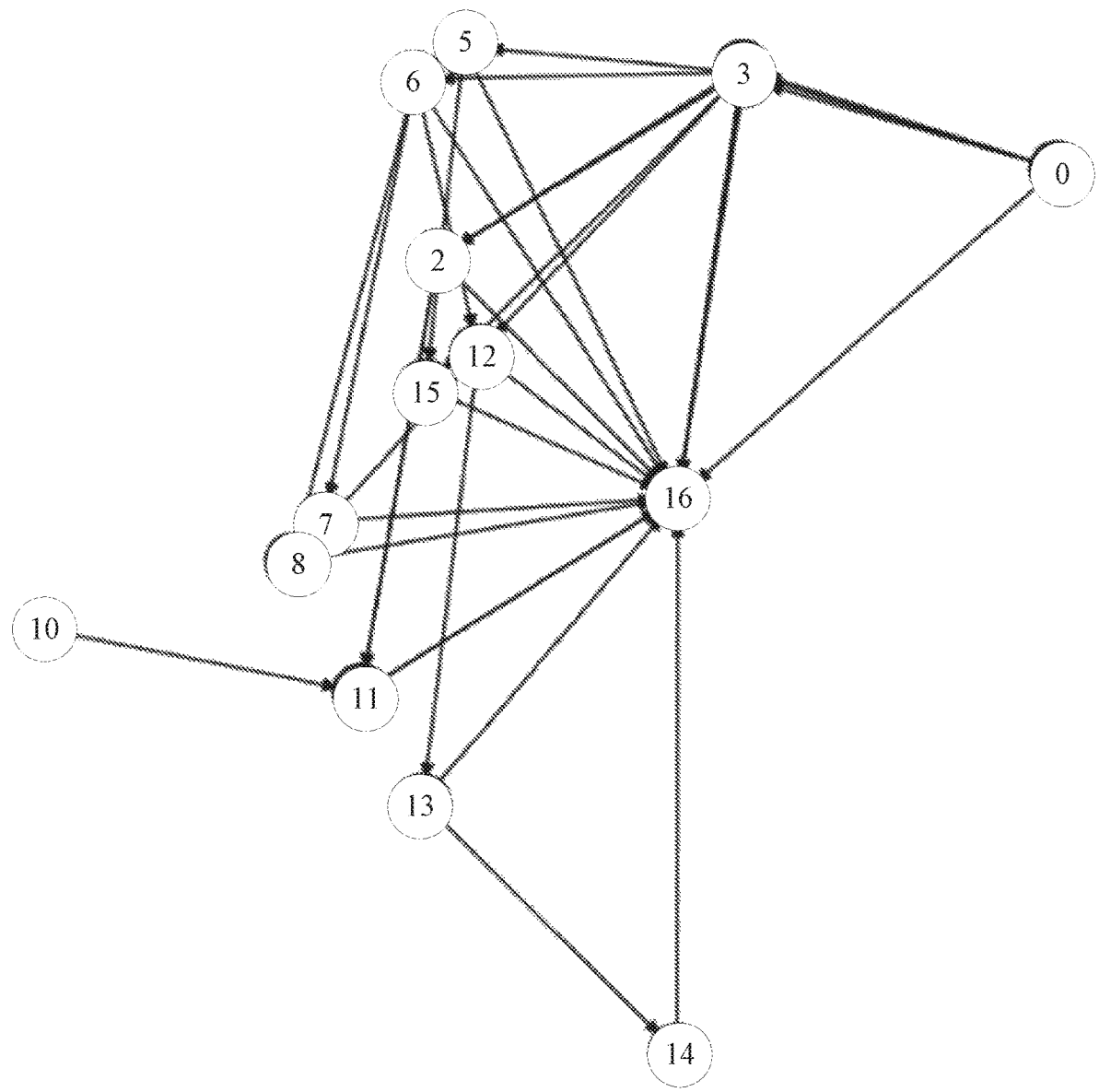
FIG. 2 is a simplified diagram illustrating an example dialogue structure in a language domain, according to embodiments described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Analysis of semantic state transitions is useful in the development of dialogue systems, for example in response generation tasks (e.g., chat bots). High-quality dialogue data with complete dialogue state annotation can be of limited availability for training purposes. Extracting structure information from dialogue data without requiring human annotation is therefore helpful in the creation and improvement of response generation systems. Some existing systems emphasize unsupervised learning of dialogue structures, for example training language models based on Hidden Markov Models (HMMs) or Variational AutoEncoders (VAEs) to reconstruct the original dialogues. The structure built upon the latent states is then evaluated in downstream tasks like dialogue policy learning. Since the latent states are implicitly defined, there is a gap between the learned structure and the canonical dialogue states in task-oriented dialogues, making the structure hard to interpret and analyze. In addition, it remains unclear how the number of states during extraction shall be chosen, because the state number directly dictates the structure granularity, but it is often not available at the time when the state structure is generated.

In view of the existing issues in generating dialogue structures, embodiments described herein propose an approach for unsupervised structure extraction in task-oriented dialogues. Specifically, a Slot Boundary Detection (SBD) module may tag utterances from training domains with the conventional BIO schema but without the slot names. A transformer-based classifier is trained to detect the boundary of potential slot tokens in the test domain so as to identify slots. The detected slot tokens are clustered into the number of slot of groups. Finally, the dialogue state is represented with a vector recording the modification times of every slot. The slot values are then tracked through each dialogue session in the corpus and label utterances with their dialogue states accordingly. The semantic structure is portrayed by computing the transition frequencies among the unique states.

FIG. 1 is a simplified diagram illustrating an example dialogue in the language domain, according to embodiments described herein. Semantic state transition in dialogue systems may be used to learn dialogue information in response generation tasks. Dialogue states are defined as the status of a set of slots. The domain-specific slots are often manually designed and their values are updated through the interaction with users.

Extracting structure information from dialogue data is thus an important topic for us to analyze user behavior and system performance. It also provides us with a discourse skeleton for data augmentation. In the example of FIG. 1, the first user utterance does not contain any identified tokens, so the dialogue state values start as [0,0,0] where each 0 represents the number of times a token belonging to that slot has appeared in an utterance. The second utterance has the token "centre" identified with the first slot, which updates the dialogue state values update to [1,0,0]. Finally, the last utterance has the token "cinema" identified, which corresponds to the second slot, which updates the dialogue state values to [1,1,0].

FIG. 2 is a simplified diagram illustrating an example dialogue structure (i.e., semantic structure) of the dialogue shown in FIG. 1 in a language domain, according to embodiments described herein. Each node of the dialogue structure represents a distinct dialogue state such as the examples shown in FIG. 1. Edges illustrate transitions between dialogue states. Building a dialogue structure over multiple dialogues, relative strengths may be associated with each edge representing the probability of making that state transition. Useful information may be derived from such a dialogue structure, either by human interpretation, or by incorporating the structure in an automated training strategy.

The problem of recovering a probabilistic semantic structure shared by dialogues in the same domain may be formulated as labeling each dialogue in the corpus with a sequence of dialogue states. A structure is then extracted by calculating the transition frequencies between pairs of states. Each conversational exchange $x_i$ (a pair of system and user utterances at time step i) corresponds to a dialogue state $z_i$, which tracks the status of the task and guide the upcoming dialogue. The dialogue state is defined as the set of slots and the modification times of their values. Specifically, $$z_i = [M(S_0), M(S_1), \ldots, M(S_N)]$$

where $M(S_j)$ is the number of changes of slot $S_j$ since the beginning of the dialogue session, and N is the number of slots in the given domain. The number of slots is provided during inference, which is assumed to be an available prior knowledge in practice.

In a modularized dialogue system, the slots are pre-defined as an ontology of a domain, and the system needs to identify their values to accomplish users' intents. For example, in order to book a taxi service, the values of slots: 'leave-at', 'arrive-by', 'departure' and 'destination' are to be filled. However, such a slot ontology is not available in an unsupervised setting. A preliminary task of Slot Boundary Detection and Clustering for dialogue structure extraction is first performed. Specifically, given a target domain G, a set of dialogues D, and the number of slots N, the task is to find the token spans that are possible slots in domain G and assign them into N separate slot groups.

Figure 3:
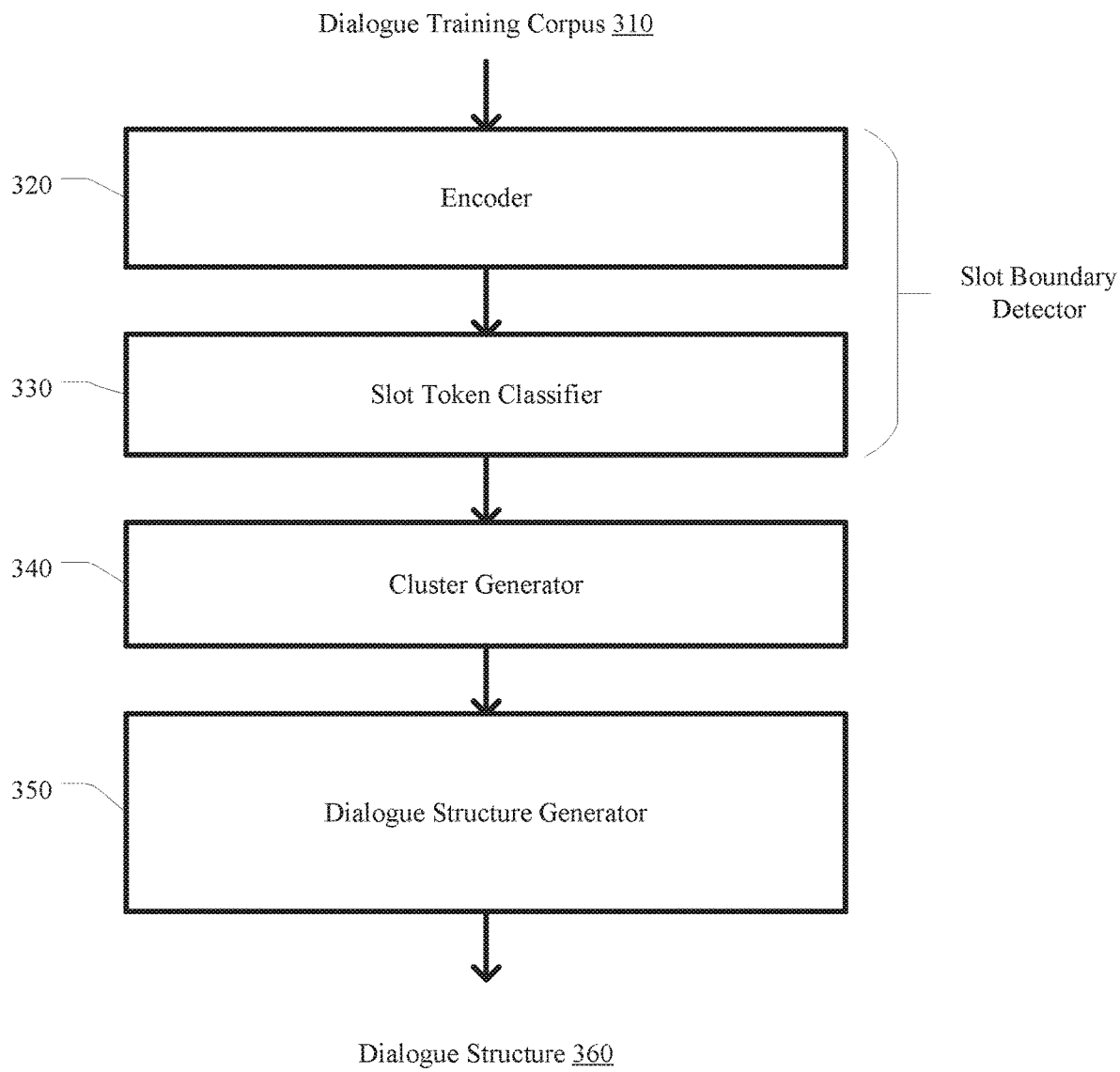
FIG. 3 is a simplified diagram showing an example architecture for a dialogue structure generation system.

FIG. 3 is a simplified diagram showing an example structure 300 for a dialogue structure generation system. An input dialogue training corpus 310 may be received by the system. The dialogue training corpus may include a number of conversations between a user and a system. For example, each conversation may have utterances by a user, where each utterance is followed by a system response. In some embodiments, the training corpus is derived from a task-oriented system, for example a chat bot designed to assist in picking a movie to watch.

An encoder 320 may encode the identified spans of tokens. In some embodiments, the encoding is based not only on the token span itself but the context of the utterance, such that two identical token spans may be encoded differently based on their context. For example, the token span $T_i$ is encoded as:

$$\bar{h}_i = \frac{1}{k}\sum_{j=1}^{k} h_{ij}$$

where $h_{i1}, \ldots, h_{ik}$ are the final hidden states of $T_i = [T_{i1}, \ldots, T_{ik}]$. The BERT representations are contextualized, so the same token spans appearing in different contexts have different encodings.

A slot token classifier 330 may identify spans of encoded tokens as slot candidates within each user utterance. For example, in the utterance "I want to see a nature documentary tonight" may have "nature documentary" and "tonight" tagged as token spans of interest for categorizing as slots.

In one embodiment, the slot token classifier 330 may identify slot tokens across domains. For example, a BERT-based slot token classifier may be trained on some domains, and may be applied to a different domain to predict the BIO tag for each token. The slot clustering may be based on contextualized token representation from the same BERT model. Note that token spans are classified, but it is unknown at this stage how they correspond to specific slots.

Specifically, given an input token sequence $x=(x_1, \ldots, x_T)$, the final hidden states of BERT ($h_t$) is fed into a softmax layer to classify over the three labels ("B", "I", "O").

$$y_t = \text{softmax}(Wh_t+b)$$

The original label of a word is assigned to all its sub-tokens. The model may be trained end-to-end to minimize with cross-entropy loss. For each token span $T_i=[T_{i1}, \ldots, T_{ik}]$, if their slot labels predicted are {B, I, ..., I}(k>1) or B(k=1), and the label of the token $T_{ik+1}$ is predicted as B or O, then $T_i$ is considered as a slot token span. The encoder 320 and slot token classifier 330 comprise a slot-boundary detector.

A cluster generator module 340 may identify clusters of encoded token spans generated from the encoder 320 and classified by the slot token classifier 330. The number of clusters (i.e., slot groups) desired may be pre-defined for the cluster generator 340. Based on the identified number of clusters, cluster generator 340 may group the encoded token spans into that many slot groups.

Specifically, the final hidden states of BERT, BERT ($h_t$), may be reused for slot clustering. One token span can be assigned to multiple slot clusters simultaneously. For example, "Palo Alto" can be both a departure city and an arrival city, depending on its context. By clustering the token span encodings, each of them may be assigned into one of the N groups and derive a fake slot ontology.

$$S'_j = \text{clustering}(\bar{h}_i), j \in \{1, \ldots, N\}$$

where $S'_j$ is the j-th predicted slot group. A number of different clustering algorithms may be used, including: Kmeans as described in Arthur and Vassilvitskii, k-means++: The advantages of careful seeding, Technical Report, Stanford, 2006; Birch as described in Zhang et al., Birch: an efficient data clustering method for very large databases, ACM sigmod record, 25(2): 103-114, 1996; and Agglomerative Clustering as described in Milliner, Modern hierarchical, agglomerative clustering algorithms, arXiv preprint arXiv:1109.2378, 2011.

Dialogue structure generator 350 may generate a dialogue structure 360 based on a sequence of states corresponding to predicted tags associated with the slot groups generated from the cluster generator module 340. For example, as shown in FIG. 2, a dialogue structure may have a number of nodes which represent distinct dialogue states, and edges between the nodes indicate transitions between pairs of states. Dialogue states may be defined by slots identified in utterances. Dialogue structure 360 may be used in a number of ways, for example it may be incorporated as training data for an intelligent dialogue agent.

In one embodiment, dialogue structure generator 350 may adopt a deterministic procedure to construct the dialogue structure. To begin with, the dialogue state is initialized as $z_0=[0, 0, \ldots, 0]$. Then, in dialogue turn k, for each slot token span $T_i$ detected, if the clustering algorithm determines $T_i \in S'_j$, then $M(S'_j)$ is incremented by one, as demonstrated in FIG. 1. In this way, each dialogue session is labelled with its extracted dialogue states without any state annotation. The dialogue structure is then depicted by representing distinct dialogue states as nodes. Due to the variety of $M(S'_j)$, the number of dialogue states is always larger than the number of slots. For example, in the MultiWOZ dataset, the "Taxi" domain includes 435 samples, 4 slots, and 29 states (i.e., annotated distinct dialogue states). In another example in the MultiWOZ dataset, the restaurant domain includes 1,311 samples, 7 slots, and 206 states.

FIG. 4 is a simplified diagram illustrating an example aspect of slot boundary annotation performed by the slot token classifier 330 shown in FIG. 3, according to embodiments described herein. The utterances illustrated are from three different task-oriented dialogue datasets: MultiWOZ (as described in Budzianowski et al., MultiWOZ—a large-scale multi-domain Wizard-of-Oz dataset for task-oriented dialogue modelling, in Proceedings of the 2018 Conference on Empirical Methods in Natural Language Processing, pages 5016-5026, 2018); ATIS as described in (Tur et al., What is left to be understood in atis? In 2010 IEEE Spoken Language Technology Workshop, pages 19-24, 2010); and Snips (as described in Coucke et al., Snios voice platform: an embedded spoken language understanding system for private-by-design voice interfaces, arXiv preprint arXiv: 1805.10190, 2018). A "BIO" schema as illustrated may be used to tag the tokens, where a "B" indicates a token that is the beginning of a span, an "I" indicates the continuation of a span, and an "O" indicates the token is not part of a span. In example 410, token spans "London King Cross" and "8:15" are indicated by the BIO schema. In example 420, token spans "Baltimore," "Dallas," and "round trip" are identified. In example 430, token spans "restaurant," "eight," and "in six years" are identified.

Figure 5:
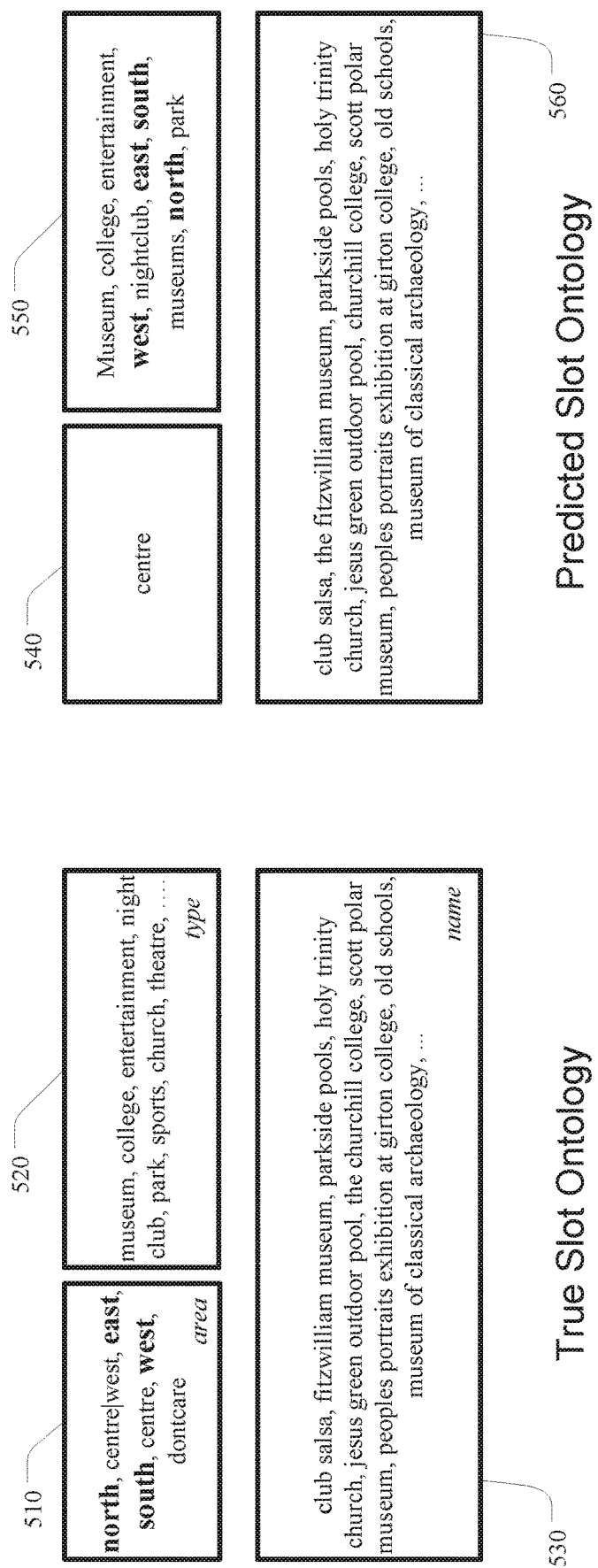
FIG. 5 is a diagram of a true slot ontology and a predicted slot ontology.

FIG. 5 is a diagram showing examples of a true slot ontology and a predicted slot ontology generated by the cluster generator module 340 in FIG. 3. This is an example of clustered token spans. Specifically, it is a comparison of a true slot ontology and a predicted slot ontology of the "attraction" domain in the MultiWOZ dataset. Mis-clustered tokens are bolded. Cluster 510 is a cluster labelled area, cluster 520 is a cluster labelled type, and cluster 530 is a cluster labelled name. Typically these labels are human-annotated. Note that in the predicted slot ontology, slot names are unknown but it will not affect the structure extraction procedure. Clusters 540, 550, and 560 that are generated by the cluster generator 340 are similar to clusters 510, 520, and 530, in that many tokens are clustered together the same. However, clusters 540, 550, and 560 do not have labels. Further, there are some items clustered incorrectly which are bolded. For example, cluster 550 contains tokens "west", "east", "south", and "north" in the cluster that includes other tokens which are apparently "type" tokens as in cluster 520.

Figure 6:
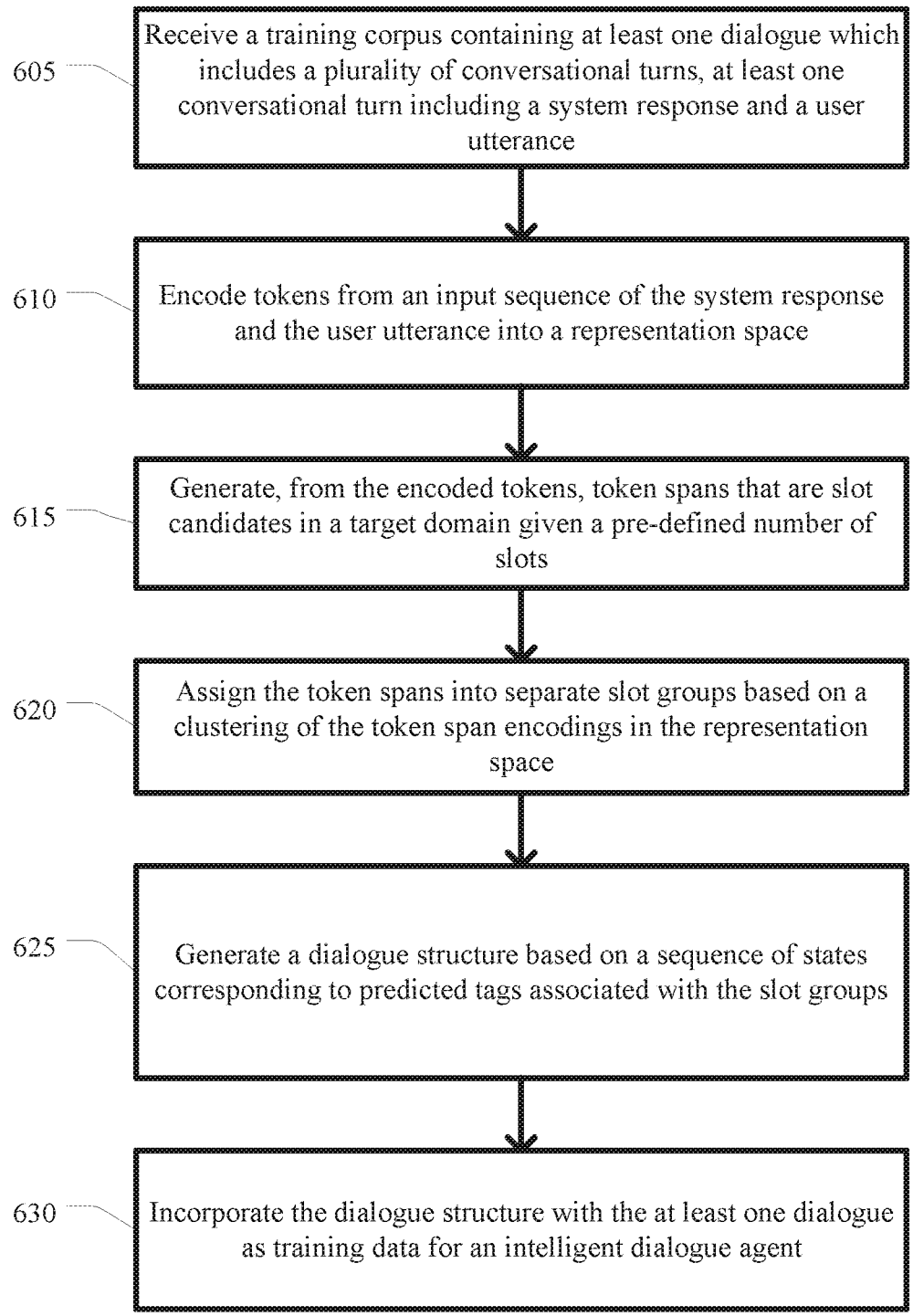
FIG. 6 is an example logic flow diagram illustrating an example method for a dialogue structure system, according to some embodiments.

FIG. 6 is an example logic flow diagram illustrating an example method 600 for a dialogue structure system, according to some embodiments. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the system of FIG. 3. In some embodiments method 600 is performed by computing device 700 (e.g., module 730) of FIG. 7.

At block 605, a system receives (e.g., via communication interface 715) a training corpus containing at least one dialogue which includes a plurality of conversational turns, at least one conversational turn including a system response and a user utterance. In some embodiments, the domain of the training corpus is different than a target domain. The training corpus may be augmented by a number of different data augmentation techniques described below with reference to FIGS. 10-12.

At block 610, an encoder (e.g., 320 in FIG. 3) encodes tokens from an input sequence of the system response and the user utterance into a representation space. In some embodiments, the encoding is BERT-based. The encoder may base the encoding on the token being encoded, and also by the surrounding words in the utterance. In this way two identical tokens may be encoded different based on their context.

At block 615, a slot token classifier (e.g., 330 in FIG. 3) generates, from the encoded tokens, token spans that are slot candidates in a target domain given a pre-defined number of slots. For example, as shown in FIG. 4, "London King Cross" is identified as a slot candidate by the BIO scheme in example 410. In some embodiments, the slot boundary detector is a transformer-based classifier trained to detect the boundary of potential slot tokens in a test domain different than the target domain.

At block 620, a cluster generator (e.g., 340 in FIG. 3) assigns the token spans into separate slot groups based on a clustering of the token span encodings in the representation space. The number of slot groups may be user-defined based on a predicted number of groups for the target domain or the training data domain.

At block 625, a dialogue structure generator (e.g., 350 in FIG. 3) generates a dialogue structure based on a sequence of states corresponding to predicted tags associated with the slot groups. As described with reference to FIGS. 2-3, the dialogue structure may include nodes which represent dialogue states, and edges which represent transitions between those states found in the training corpus.

At block 630, the system incorporates the dialogue structure with the at least one dialogue as training data for an intelligent dialogue agent. For example, information about the most probable state transitions may be used in training a dialogue agent.

Figure 7:
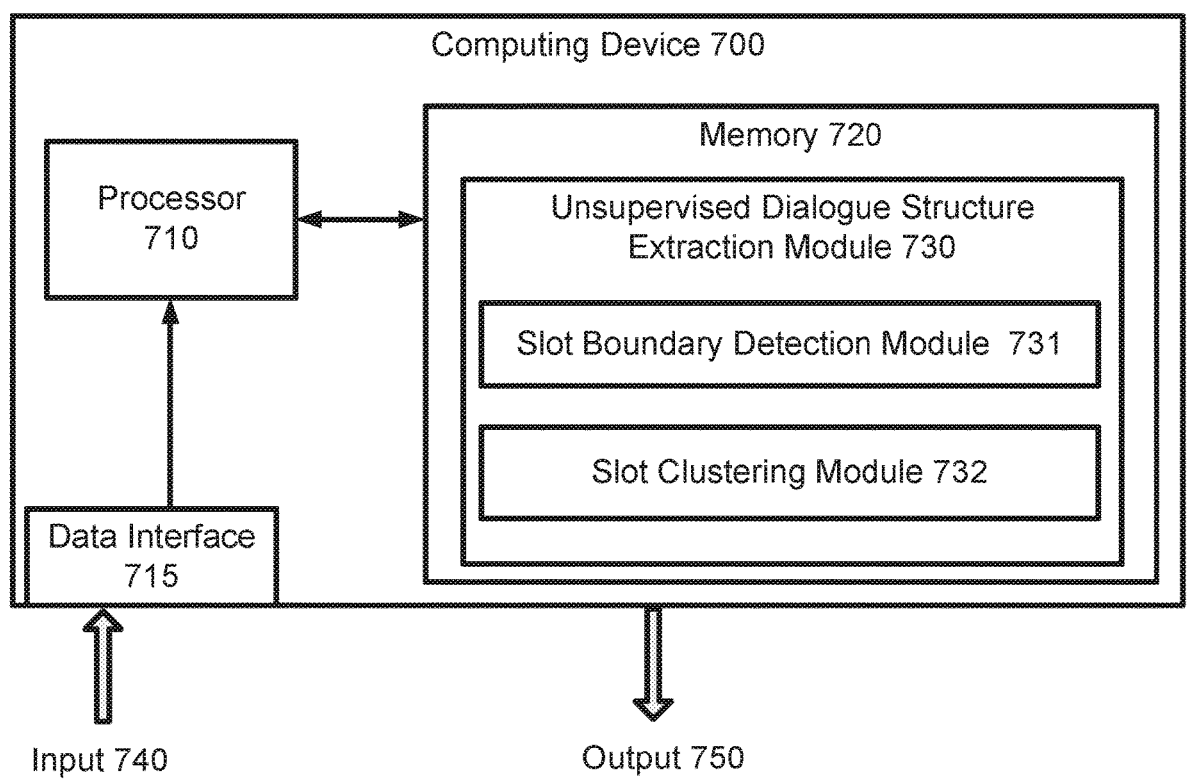
FIG. 7 is a simplified diagram of a computing device for implementing unsupervised structure extraction, according to some embodiments.

FIG. 7 is a simplified diagram of a computing device 700 for implementing unsupervised dialogue structure extraction, according to some embodiments. As shown in FIG. 7, computing device 700 includes a processor 710 coupled to memory 720. Operation of computing device 700 is controlled by processor 710. And although computing device 700 is shown with only one processor 710, it is understood that processor 710 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 700. Computing device 700 may be implemented as a stand-alone subsystem, as a board added to a computing device, and/or as a virtual machine.

Memory 720 may be used to store software executed by computing device 700 and/or one or more data structures used during operation of computing device 700. Memory 720 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 710 and/or memory 720 may be arranged in any suitable physical arrangement. In some embodiments, processor 710 and/or memory 720 may be implemented on a same board, in a same package (e.g., system-in-package), on a same chip (e.g., system-on-chip), and/or the like. In some embodiments, processor 710 and/or memory 720 may include distributed, virtualized, and/or containerized computing resources. Consistent with such embodiments, processor 710 and/or memory 720 may be located in one or more data centers and/or cloud computing facilities.

In some examples, memory 720 may include non-transitory, tangible, machine readable media that includes executable code that when run by one or more processors (e.g., processor 710) may cause the one or more processors to perform the methods described in further detail herein. For example, as shown, memory 720 includes instructions for unsupervised dialogue structure extraction module 730 that may be used to implement and/or emulate the systems and models, and/or to implement any of the methods described further herein. A trained unsupervised dialogue structure extraction module 730 may receive input that includes a task-oriented dialogue 740 (e.g., see FIG. 1) via the data interface 715 and generate a dialogue structure (e.g., see FIG. 2) as output 750.

In some embodiments, the unsupervised dialogue structure extraction module 730 includes a slot boundary detection module 731 and a slot clustering module 732.

In one embodiment, the unsupervised dialogue structure extraction module 730 and its submodules 731-732 may be implemented by hardware, software and/or a combination thereof.

Some examples of computing devices, such as computing device 700 may include non-transitory, tangible, machine readable media that include executable code that when run by one or more processors (e.g., processor 710) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIG. 8 is an exemplary table illustrating performance of slot boundary detection tested with the MultiWOZ dataset. Each row of the table is a different training domain, and each column is a different testing domain. MultiWOZ has 8,420/1,000/1,000 dialogues for training, validation, and testing, respectively. The MultiWOZ has five domains of dialogues: taxi, restaurant, hotel, attraction, and train. In the results described below, each of the domains is held out for testing and the remaining four domains are used for training the slot boundary detection model. Some of the target slots are not presented in the training slots, e.g., "stay", "stars", and "internet" only appear in the hotel domain. To evaluate the transferability of the approach, the slot boundary detector was also tested on ATIS and Snips. The ATIS dataset includes recordings of people making flight reservations and contains 4,478 utterances in its training set. The Snips dataset is collected from the Snips personal voice assistant and contains 13,084 training utterances. A slot boundary detector was trained on their training split and tested on the selected domain of MultiWOZ. The spaCy training method in the table is for comparison and does not use slot-boundary detection. Rather, it implements a heuristic-based detector with spaCy. In the spaCy method, words are labeled as slot spans if they are nouns.

In the results illustrated in FIG. 8, the ground truth construction follows the same deterministic procedure by counting the modification times of annotated slot values, instead of the spans predicted by the algorithm. An F1 Score (i.e., the harmonic mean of the precision and recall) is reported in both the slot level ($F1_{slot}$) and token level ($F1_{token}$). In the slot level, a slot prediction is considered correct only when an exact match is found, which doesn't reward token overlap (partial match). In general, BERT-based slot boundary detectors perform better than the heuristic-based detector. Because utterances in MultiWOZ share similar interaction behaviors and utterance lengths, it makes the model easier to transfer from one domain to another within MultiWOZ than from the ATIS and Snips to the MultiWOZ.

FIG. 9 is an exemplary table illustrating structure extraction results using clustering metrics in the MultiWOZ dataset. Measurements include the adjusted rand index (ARI) which is a function that measures the similarity of the two assignments. Mathematically, $$RI = \frac{a+b}{C_2^{n_{samples}}}$$

$$ARI = \frac{RI - E[RI]}{\max(RI) - E[RI]},$$

Where a is the number of pairs of elements that are assigned to the same stet by the ground truth and the model, b is the number of pairs of elements that are assigned to different sets, $C_2^{n_{samples}}$ is the total number of pairs in the dataset. The ARI corrects for chance and guarantees that random assignments have an ARI close to 0. Another illustrated measurement is adjusted mutual information (AMI) and silhouette coefficient (SC). While both ARI and AMI require the knowledge of the ground truth classes, SC evaluates the model itself but needs utterance representations to compute the distance. Thus SC is not reported for methods such as TOD-BERT-DET. Mathematically, $$SC = \frac{b-a}{\max(a,b)}$$

Where a is the mean distance between the sample and all other points in the same class, b is the mean distance between a sample and all other points in the next nearest cluster.

Models tested as illustrated in FIG. 9 include Random, where every conversational turn is randomly assigned a state by selecting a number from 1 to the ground truth states of MultiWOZ. For VRNN, dialogues are reconstructed with variational recurrent neural networks as described in Shi et al., Unsupervised dialog structure learning, In proceedings of the 2019 Conference of the North American Chapter of the Association for Computational Linguistics: Human Language Technologies, Volume 1, pages 1797-1807, 2019.

For Bert-KMeans/Birch/Agg, each conversational turn is encoded by BERT with the final hidden state of CLS token. The utterance encodings are then clustered with Kmeans, Birch, and Agglomerative clustering methods, where the number of clusters are directly set to the number of states in MultiWOZ.

For (TOD-)BERT-spaCy, instead of training a slot boundary detector based on BERT, a heuristic is used which labels words as slot spans if they are nouns. Suppose it detects n slot words $\{w_1, \ldots, w_n\}$ in the $u_i$ utterance, the j-th word has $|w_j|$ sub-tokens, the BERT/TOD-BERT encoding of the k-th sub-token of this word is $h_{jk}$. Then the turn is represented as:

$$u_i = \frac{1}{n}\sum_{j=1}^{n}\frac{1}{|w_j|}\sum_{k=1}^{|w_j|}h_{jk}$$

In this method, the slot representations are not clustered, but each slot embedding represents the whole utterance. Then $u_i$ are clustered to the number of state clusters with KMeans.

For TOD-BERT-SBD$_{MWOZ}$, it is similar to the previous approach. But instead of using a heuristic-based detector, the TOD-BERT is trained for SBD in training domains of MultiWOZ and detect slot tokens in the test domain, and then those detected slot embeddings are used to represent each utterance.

For TOD-BERT-DET$_{ATIS/SNIPS/MWOZ}$, the TOD-BERT is trained for slot boundary detection in the ATIS, Snips, or the MultiWOZ training domains. Then in the test domain of MultiWOZ, following the deterministic dialogue state labelling process described above, instead of clustering utterance embeddings, to extract a structure.

Figure 10A:
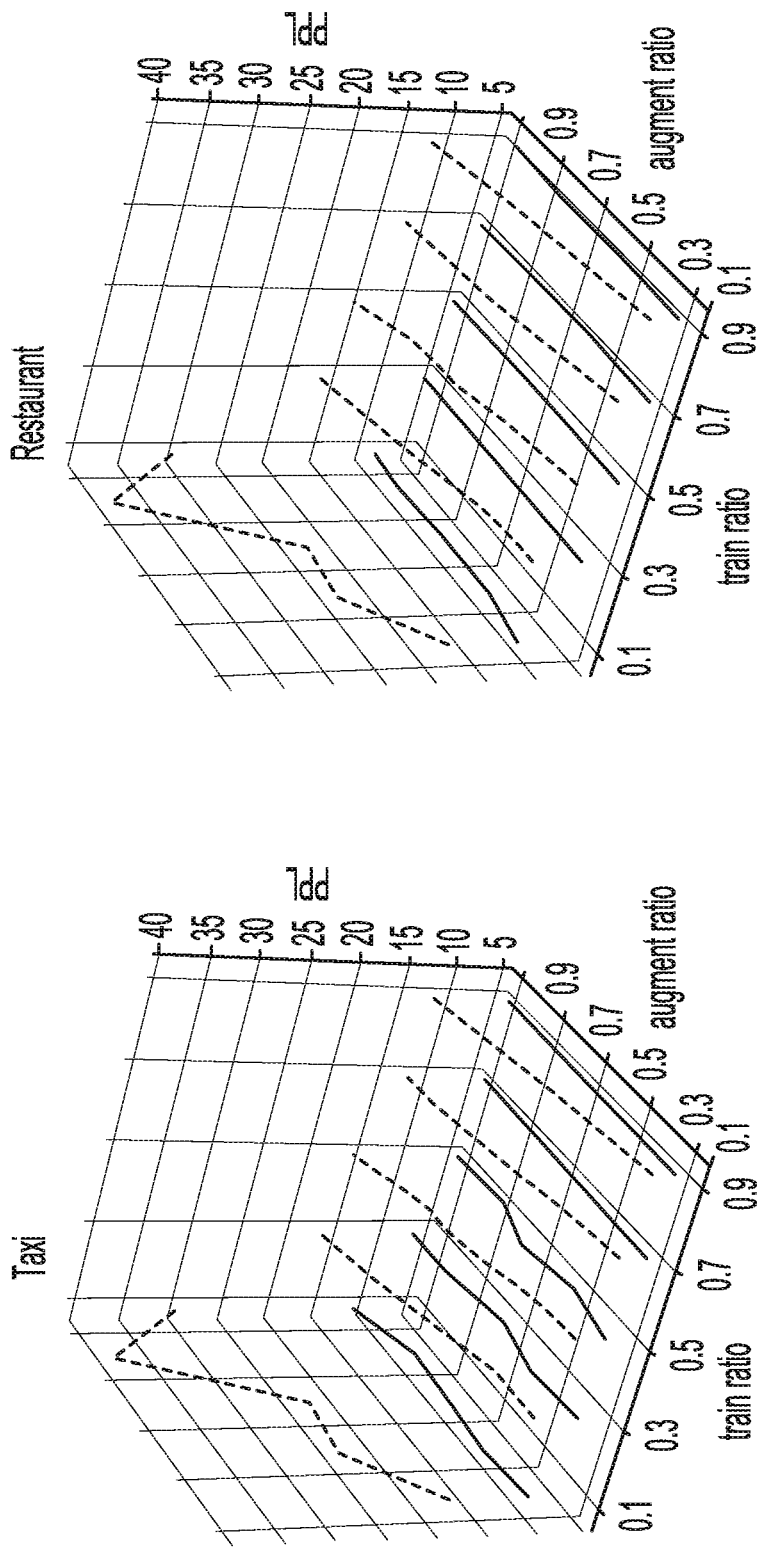
Figure 10B:
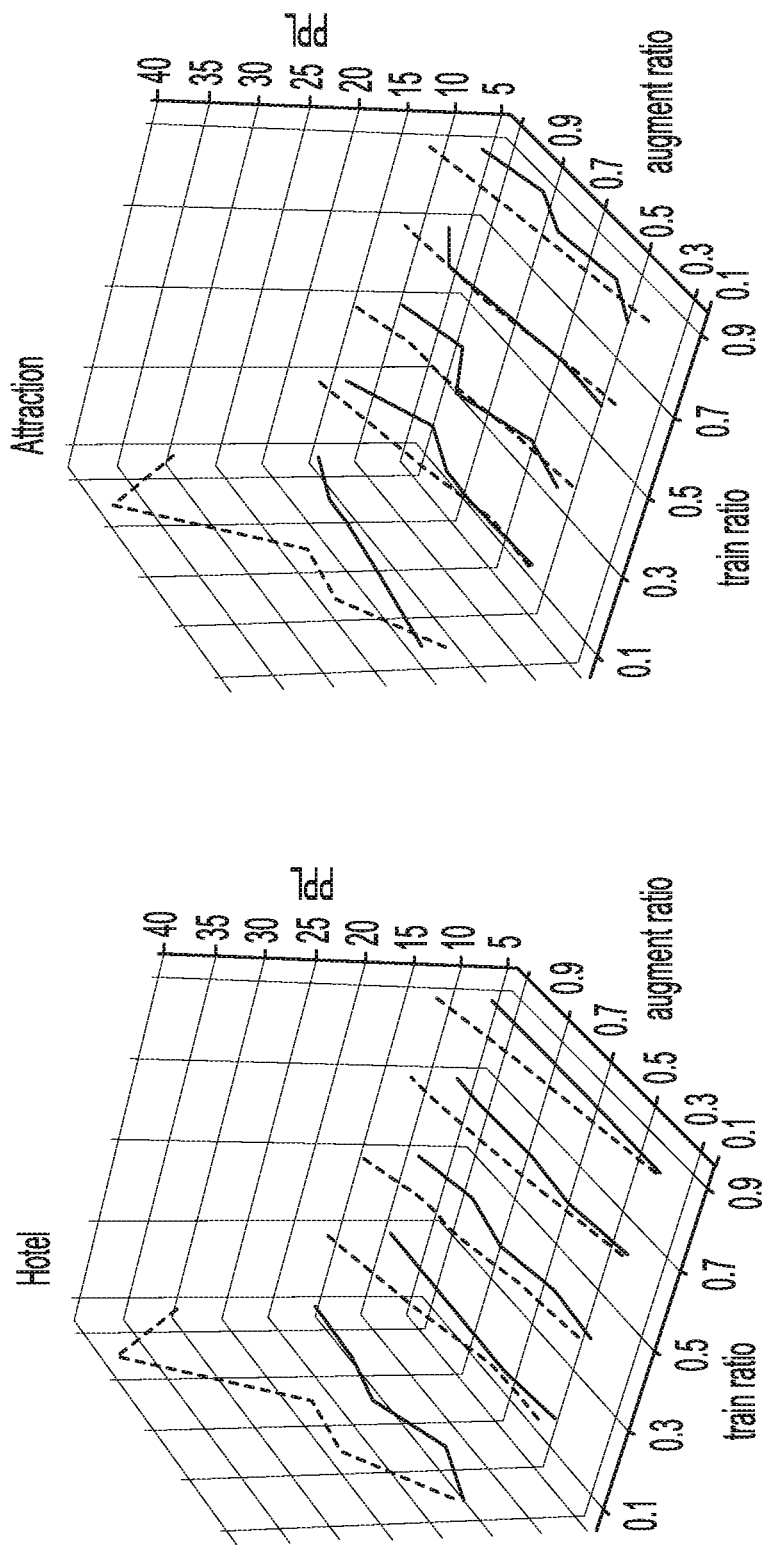
Figure 10C:
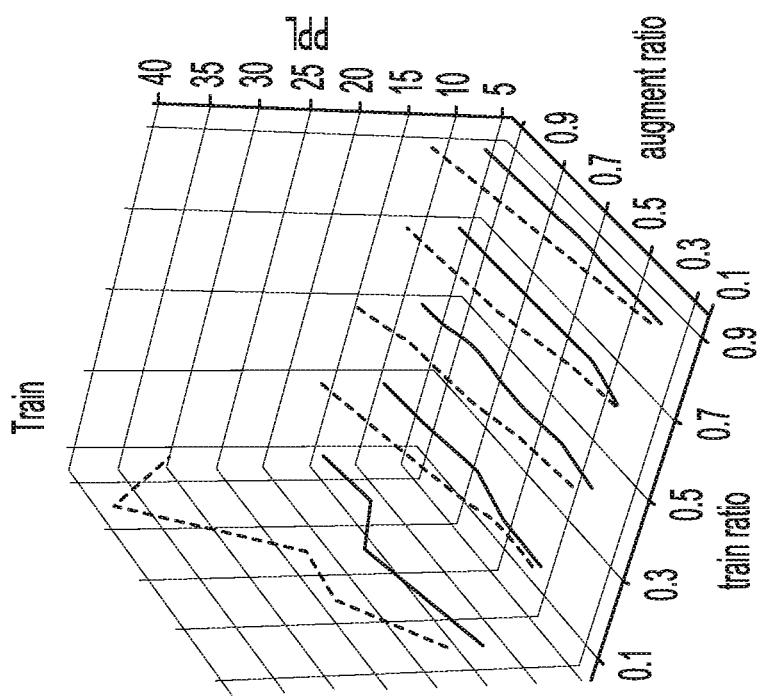
Figure 11A:
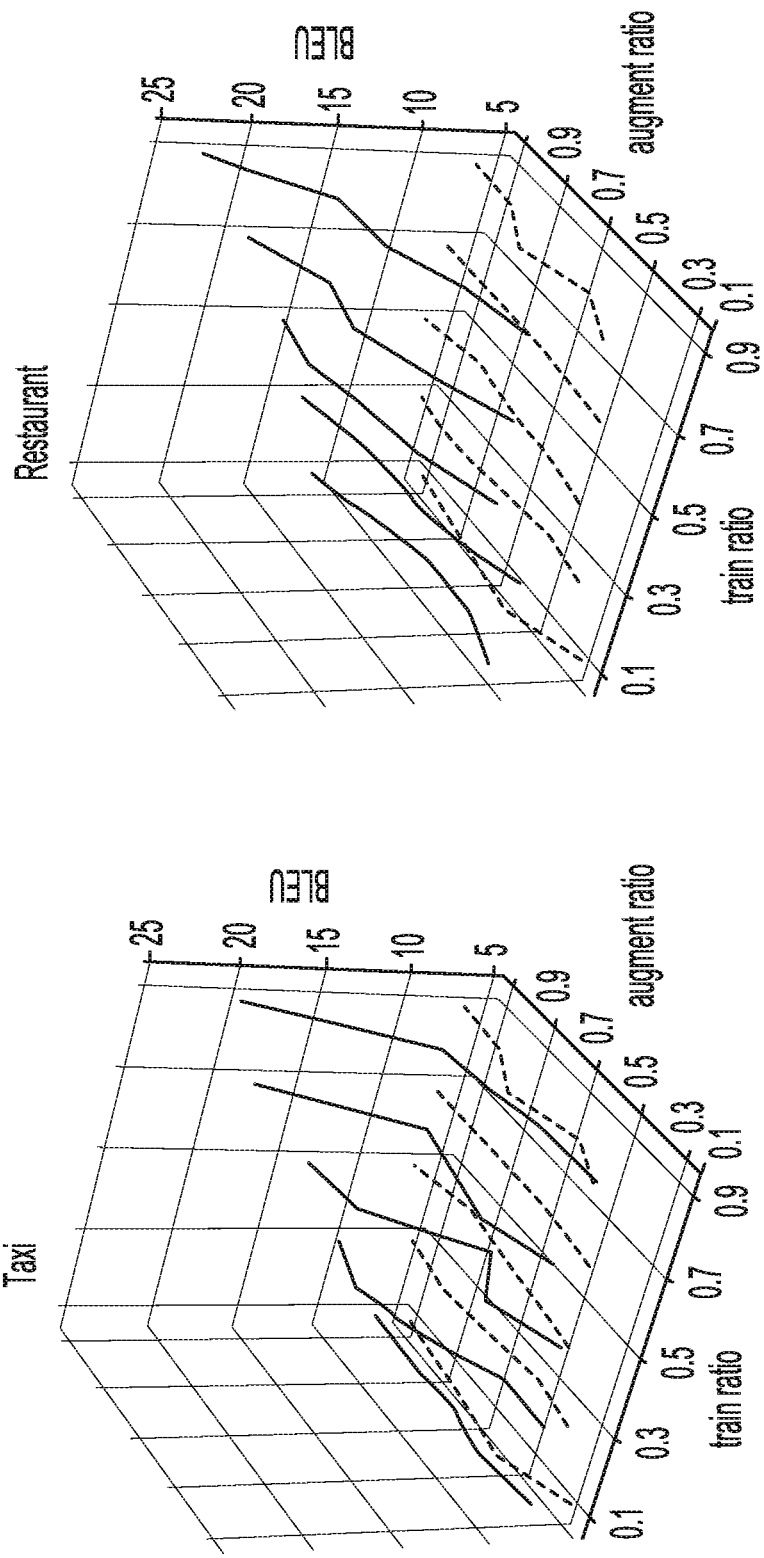
Figure 11B:
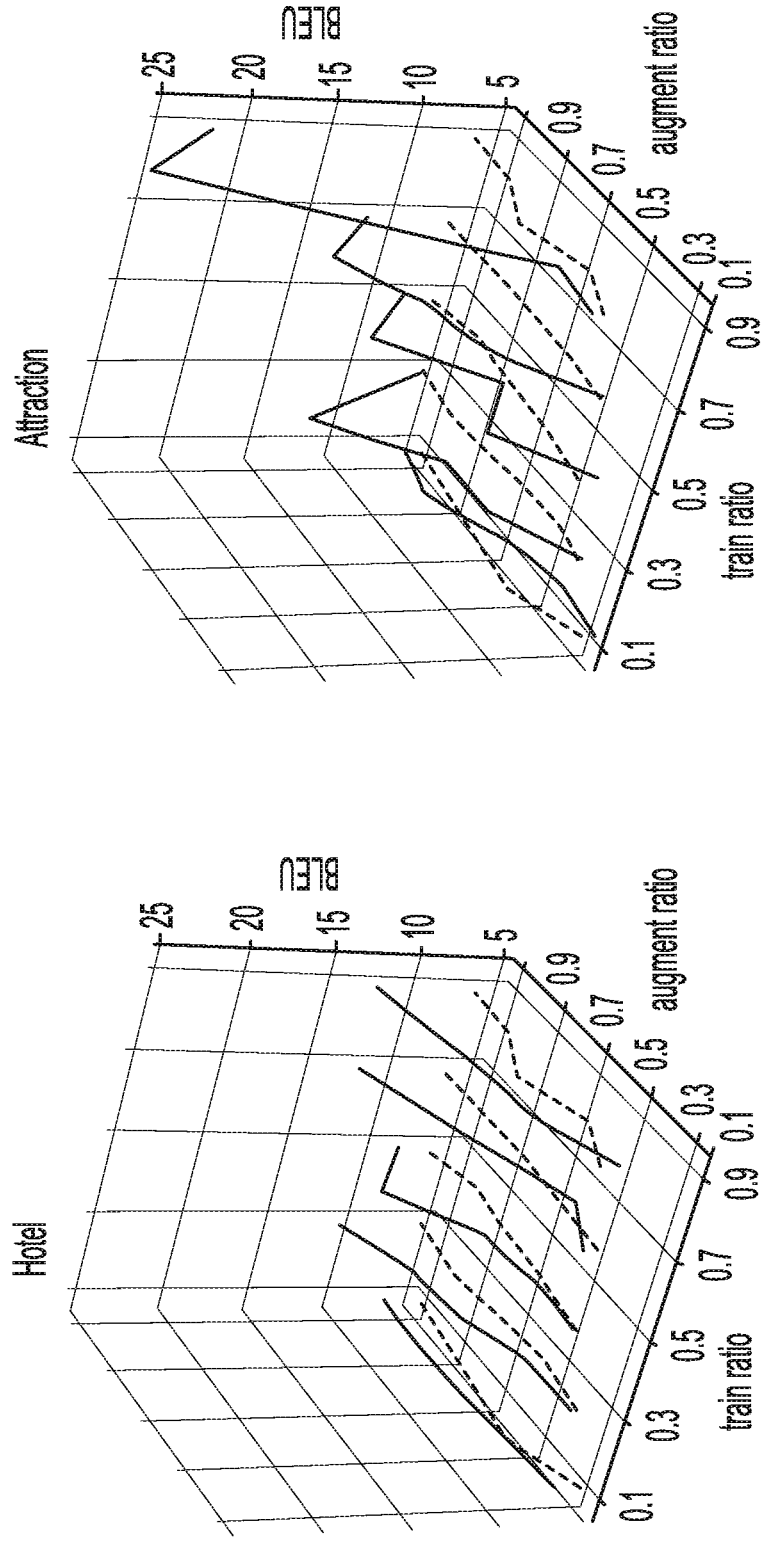
Figure 11C:
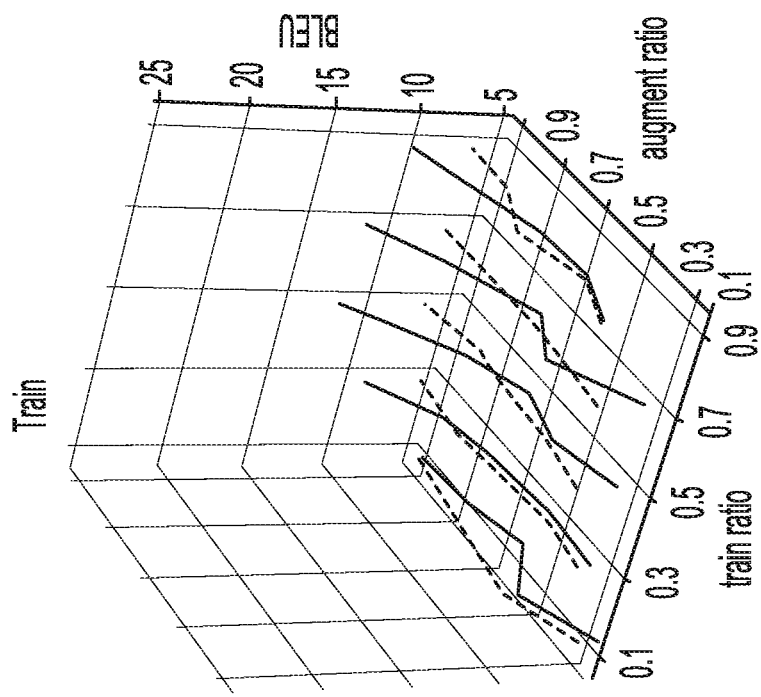

FIGS. 10-11 illustrate the performance of different data augmentation methods. Conversations have an intrinsic one-to-many property, meaning that multiple responses can be appropriate for the same dialog context. Leveraging this property, training data may be augmented to improve end-to-end dialogue response generation based on the extracted structure. Specifically, a dictionary mapping may be built from the dialogue state to its different valid utterances. Then the dictionary may be enabled to create additional data during training, which allows a language model to learn a balanced distribution.

In Single-turn dialogue generation, a response generative model is trained on an autoregressive (AR) model that maximizes the log-likelihood L of the ground truth response $R = x_{n+1}, \ldots, x_T$ conditioned on dialogue history $C = x_1, \ldots, x_n$, which is encoded by dialogue state z:

$$L = \sum_{i \in D}\log P(R_i | C_i) = \sum_{i \in D}\log \prod_{t=n+1}^{T} p(x_t | x_1, \ldots, x_{t-1})$$

Where i is each turn in dialogue corpus D. For a number of dialogue history $C_i$ belonging to the same state z, there exists K different system responses $R^{(1)}, \ldots, R^{(K)}$ that are valid, i.e., for $j=1, \ldots, K$, $\exists i \in D$s. t. $(z_i, R_i) = (z, R^{(j)})$. A valid system response set for dialogue state z is denoted as V(z).

A different method is the most frequent sampling (MFS) method for data augmentation which is based on the annotated conversational graph. MFS generates novel training instances so that the most frequent agent actions are preceded by new histories, which is one or more original paths leading to common actions.

Another method of data augmentation is multi-response data augmentation (MRDA). Data augmented with MFS may exaggerate the frequency imbalance among valid responses, resulting in a lower response diversity. The original MFS also depends on annotated dialogue states from the MultiWOZ. MRDA alleviates these problems. MRDA balances the valid response distribution of each state z based on the extracted dialogue structure. Concretely, for each dialogue turn i with state-response pair $(z_i, R_i)$, other valid system responses are incorporated under the same state, i.e., $R_{i'}$, $i' \neq i$ with $z_{i'} = z_i$, as additional training data for turn i. The new objective function becomes:

$$L_{aug} = \sum_{i \in D}\sum_{R_{i'} \in V^*(z_i)}\log P(R_{i'} | C_i)$$

Where $V^*(z_i) \subseteq V(z_i)$ is a subset of the valid response set $V(z_i)$ of dialogue state $z_i$, $z_i$ is the predicted dialogue state of history $C_i$.

The plots in FIGS. 10-11 compare the MRDA approach with the MFS baseline in the MultiWOZ dataset using generation perplexity and BLEU scores in the five domains of MultiWOZ. The ground truth dialogue states for MFS were used as in its original paper. For MRDA, each of the domains for testing was held out, and the remaining four domains were used for slot boundary detection training and dialogue state prediction. The data of each held-out domain is split into train (60%), valid (20%), and test (20%), which are used for language model training and testing. To evaluate both methods in a few-shot learning setup, the ratio between actually used training data and total training data is adjusted, denoted by $r_{train}$. Moreover, to explore the impact of augmented data size, $r_{aug}$ is defined as the ratio between the size of augmented samples and used training samples. The DIALOGPT) model as described in Zhang et al., DIALOGPT: Large scale generative pre-training for conversational response generation, In Proceedings of the 58$^{th}$ Annual Meeting of the Association for Computational Linguistics: System Demonstrations, pages 270-278, Online, 2020, is trained with the data for 5 epochs with a learning rate of 3e−5 to generate single-turn responses.

FIG. 12 reports the generation perplexity and Bleu scores in the five domains of the MultiWOZ dataset. Both augmentation methods first double the original training samples, i.e., $r_{train}=1.0$, $r_{aug}=1.0$. By augmenting the data, the perplexity is reduced by an average of 1.24 and improve the BLEU score by an average of 12.01. The results also demonstrate the approach outperforms the MFS baseline by an average of 2.14 in perplexity and 12.37 in BLEU, because the MRDA balances the valid response distribution. The approach also doesn't require any annotation of the test domain. To explore the impact of available training data size and augmented data size, different combinations of the $r_{train}$ and $r_{aug}$ were tested as illustrated in FIGS. 10-11. and illustrate the results in FIGS. 10 and 11. The figures show that the MRDA approach constantly improves the generation performance in both metrics, and it outperforms the MFS baseline regardless of the original data size. Further, the figures show that data augmentation based on a larger training set provides more performance boost because the language model is trained with more data and different valid responses are balanced. These observations suggest that the extracted dialogue structure can successfully augment meaningful dialogue for response generation, with the potential to improve other dialogue downstream tasks such as policy learning and summarization.

FIG. 13 reports how many states are overlapped in the MultiWOZ, using the slot value annotation and the dialogue state definition. It shows that the test set has no distinct dialogue state that never appears in the train or valid sets, while this may not be the case in practice. The MRDA method creates new instances that follow existing dialogue flows but with different surface formats, while it remains a compelling direction to create completely new state sequences by discovering causal dependencies in the extracted structures.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of unsupervised dialogue structure extraction, the method comprising:
   receiving a training corpus containing at least one dialogue which includes a plurality of conversational turns, at least one conversational turn including a system response and a user utterance, the user utterance including a plurality of tokens;
   determining, based on a classification model, one or more contiguous spans over one or more subsets of the plurality of tokens;
   generating token span encodings in a representation space based on the one or more contiguous spans and a context including the user utterance;
   assigning the token span encodings into separate slot groups based on a clustering of the token span encodings in the representation space and a pre-defined number of slot groups;
   generating a dialogue structure based on a sequence of states corresponding to predicted tags associated with the slot groups; and
   incorporating the dialogue structure with the at least one dialogue as training data for an intelligent dialogue agent.

2. The method of claim 1, further comprising:
   training the intelligent dialogue agent for a downstream task of generating dialogue responses based on the training data comprising the dialogue structure.

3. The method of claim 1, wherein the token spans are generated by:
   inputting the plurality of tokens to a language model;
   classifying each token in the plurality of tokens based on final hidden states of the language model as a schema tag; and
   generating a boundary of potential slot tokens based on classified schema tags associated with tokens.

4. The method of claim 1, wherein the clustering of the token span encodings is based on contextualized token representations of the token spans.

5. The method of claim 1, wherein the dialogue structure is generated by incrementing values in a dialogue state vector based on the clustering of the token span encodings.

6. The method of claim 1, wherein the training corpus is augmented by generating additional valid system responses for each dialogue turn associated with each state of the sequence of states.

7. The method of claim 1, wherein the encoding the token spans is at least partially based on surrounding tokens of the token spans.

8. A system for unsupervised dialogue structure extraction, the system comprising:
   a memory that stores a dialogue structure extraction model;
   a communication interface that receives a training corpus containing at least one dialogue which includes a plurality of conversational turns, at least one conversational turn including a system response and a user utterance, the user utterance including a plurality of tokens; and
   one or more hardware processors that:
      determines, based on a classification model, one or more contiguous spans over one or more subsets of the plurality of tokens;
      generates token span encodings in a representation space based on the one or more contiguous spans and a context including the user utterance;
      assigns the token span encodings into separate slot groups based on a clustering of the token span encodings in the representation space and a pre-defined number of slot groups;
      generates a dialogue structure based on a sequence of states corresponding to predicted tags associated with the slot groups; and
      incorporates the dialogue structure with the at least one dialogue as training data for an intelligent dialogue agent.

9. The system of claim 8, wherein the one or more hardware processors further:
   trains the intelligent dialogue agent for a downstream task of generating dialogue responses based on the training data comprising the dialogue structure.

10. The system of claim 8, wherein the one or more hardware processors generates the token spans by:
- inputting the plurality of tokens to a language model;
- classifying each token in the plurality of tokens based on final hidden states of the language model as a schema tag; and
- generating a boundary of potential slot tokens based on classified schema tags associated with tokens.

11. The system of claim 10, wherein the clustering of the token span encodings is based on contextualized token representations of the token spans.

12. The system of claim 10, wherein the dialogue structure is generated by incrementing values in a dialogue state vector based on the clustering of the token span encodings.

13. The system of claim 8, wherein the training corpus is augmented by generating additional valid system responses for each dialogue turn associated with each state of the sequence of states.

14. The system of claim 8, wherein the encoding the token spans is at least partially based on surrounding tokens of the token spans.

15. A processor-readable non-transitory storage medium storing a plurality of processor-executable instructions for unsupervised dialogue structure extraction, the instructions being executed by a processor to perform operations comprising:
- receiving a training corpus containing at least one dialogue which includes a plurality of conversational turns, at least one conversational turn including a system response and a user utterance, the user utterance including a plurality of tokens;
- determining, based on a classification model, one or more contiguous spans over one or more subsets of the plurality of tokens;
- generating token span encodings in a representation space based on the one or more contiguous spans and a context including the user utterance;
- assigning the token span encodings into separate slot groups based on a clustering of the token span encodings in the representation space and a pre-defined number of slot groups;
- generating a dialogue structure based on a sequence of states corresponding to predicted tags associated with the slot groups; and
- incorporating the dialogue structure with the at least one dialogue as training data for an intelligent dialogue agent.

16. The processor-readable non-transitory storage medium of claim 15, further comprising:
- training the intelligent dialogue agent for a downstream task of generating dialogue responses based on the training data comprising the dialogue structure.

17. The processor-readable non-transitory storage medium of claim 15, wherein the token spans are generated by:
- inputting the plurality of tokens to a language model;
- classifying each token in the plurality of tokens based on final hidden states of the language model as a schema tag; and
- generating a boundary of potential slot tokens based on classified schema tags associated with tokens.

18. The processor-readable non-transitory storage medium of claim 17, wherein the clustering of the token span encodings is based on contextualized token representations of the token spans.

19. The processor-readable non-transitory storage medium of claim 17, wherein the dialogue structure is generated by incrementing values in a dialogue state vector based on the clustering of the token span encodings.

20. The processor-readable non-transitory storage medium of claim 15, wherein the training corpus is augmented by generating additional valid system responses for each dialogue turn associated with each state of the sequence of states.

* * * * *